(12) United States Patent
Camarena et al.

(10) Patent No.: US 9,909,934 B2
(45) Date of Patent: Mar. 6, 2018

(54) SYSTEMS AND METHODS FOR CALIBRATING A TEMPERATURE DETECTION MODULE

(71) Applicants: Jose A. Camarena, Austin, TX (US); Khoi B. Mai, Austin, TX (US); Dale J. McQuirk, Austin, TX (US)

(72) Inventors: Jose A. Camarena, Austin, TX (US); Khoi B. Mai, Austin, TX (US); Dale J. McQuirk, Austin, TX (US)

(73) Assignee: NXP USA, Inc., Austin, TX (US)

( * ) Notice: Subject to any disclaimer, the term of this patent is extended or adjusted under 35 U.S.C. 154(b) by 577 days.

(21) Appl. No.: 14/194,105

(22) Filed: Feb. 28, 2014

(65) Prior Publication Data

US 2015/0247764 A1  Sep. 3, 2015

(51) Int. Cl.
*G01K 7/01* (2006.01)
*G01K 15/00* (2006.01)
*G01K 3/00* (2006.01)

(52) U.S. Cl.
CPC .......... *G01K 15/005* (2013.01); *G01K 3/005* (2013.01); *G01K 7/01* (2013.01)

(58) Field of Classification Search
CPC ........ G01K 7/00; G01K 15/005; G01K 15/00; G01K 15/007; G01K 7/01; G01K 7/16; G01K 13/02; G01K 15/002; G01K 3/005; G01K 7/015; G06F 1/206

USPC ............. 374/170, 178, 1, 183; 702/99, 130; 327/512, 513; 324/762.01, 762.02, 324/762.03
See application file for complete search history.

(56) References Cited

U.S. PATENT DOCUMENTS

| | | | | |
|---|---|---|---|---|
| 3,812,717 A * | 5/1974 | Miller | ............... | H01L 29/66992 257/470 |
| 5,195,827 A * | 3/1993 | Audy | ....................... | G01K 7/01 257/467 |
| 6,275,422 B1 * | 8/2001 | Javanifard | ............. | G11O 5/147 327/512 |
| 6,554,469 B1 * | 4/2003 | Thomson | ................. | G01K 7/01 327/512 |
| 7,443,176 B2 | 10/2008 | McClure et al. | | |
| 7,674,035 B2 | 3/2010 | Pertijs et al. | | |
| 7,744,276 B2 * | 6/2010 | Webb | ..................... | G01K 7/026 136/200 |
| 8,118,487 B2 * | 2/2012 | Goh | ....................... | G01K 3/005 374/114 |
| 8,896,349 B2 * | 11/2014 | Vilas Boas | ............ | G01R 19/32 327/513 |
| 2002/0136042 A1 * | 9/2002 | Layden | ............... | H01M 2/1077 363/146 |

(Continued)

*Primary Examiner* — Gail Kaplan Verbitsky

(57) ABSTRACT

A determination is made if a temperature of a system has exceeded a hot threshold or a cold threshold. At room temperature, a first adjustment is determined for first nominal settings. The first nominal settings are for a first input to a first comparator. At room temperature, a second adjustment is determined for second nominal settings. The second nominal settings are for a first input to a second comparator. The temperature is monitored, during normal operation of the system, using a temperature dependent voltage with the first comparator adjusted with the first adjustment and second comparator adjusted with the second adjustment.

13 Claims, 4 Drawing Sheets

(56) References Cited

U.S. PATENT DOCUMENTS

| | | | | |
|---|---|---|---|---|
| 2003/0206044 | A1* | 11/2003 | Marshall | H04L 25/063 327/205 |
| 2004/0102914 | A1* | 5/2004 | More | H03M 1/1038 702/99 |
| 2005/0071116 | A1* | 3/2005 | Kim | G01K 3/005 702/132 |
| 2005/0258894 | A1* | 11/2005 | Levit | G06F 1/3203 327/544 |
| 2006/0137871 | A1* | 6/2006 | Roehm | B60H 1/00807 165/203 |
| 2006/0193370 | A1* | 8/2006 | St. Pierre | G01K 7/01 374/178 |
| 2006/0221741 | A1* | 10/2006 | Jain | G01K 7/425 365/211 |
| 2009/0190629 | A1* | 7/2009 | Fang | G01K 7/01 374/185 |
| 2013/0076381 | A1* | 3/2013 | Takayanagi | G01K 3/005 324/750.03 |
| 2013/0093467 | A1* | 4/2013 | Kosic | H03K 5/2445 327/77 |
| 2013/0128922 | A1* | 5/2013 | Cao | G01K 7/00 374/170 |
| 2013/0136149 | A1 | 5/2013 | Soenen et al. | |
| 2015/0212399 | A1* | 7/2015 | Lin | G03B 21/16 353/57 |
| 2016/0154055 | A1* | 6/2016 | Leibowitz | G01R 31/2896 324/762.03 |

* cited by examiner

SYSTEMS AND METHODS FOR CALIBRATING A TEMPERATURE DETECTION MODULE

BACKGROUND OF THE DISCLOSURE

Field of the Disclosure

The present disclosure relates in general to semiconductor devices, and more specifically to systems and methods for calibrating a temperature detection module.

Description of the Related Art

Complementary Metal Oxide Semiconductor (CMOS) temperature sensor/detection circuits are incorporated on microprocessor chips for a number of reasons including detecting attempts to breach security features on the chips. For example, some attempts to breach security features and gain access to security keys include operating the chips in extreme hot or cold temperatures to cause system malfunctions and gain access to secure data. Accordingly, a temperature detection module on a chip is typically calibrated to remove system inaccuracies due to offsets and process variation. The calibration process typically requires operating the detection circuit at a high temperature and a low temperature, which requires additional test time and cost in producing the chip. Accordingly, it is desirable to provide a chip capable of detecting temperature extremes accurately without the added costs and time delay associated with operating the chip at high and low temperatures.

BRIEF DESCRIPTION OF THE DRAWINGS

The benefits, features, and advantages of the present disclosure will become better understood with regard to the following description, and accompanying drawings where.

DETAILED DESCRIPTION

The following description is presented to enable one of ordinary skill in the art to make and use the present disclosure as provided within the context of a particular application and its requirements. Various modifications to the preferred embodiment will, however, be apparent to one skilled in the art, and the general principles defined herein may be applied to other embodiments. Therefore, the present disclosure is not intended to be limited to the particular embodiments shown and described herein, but is to be accorded the widest scope consistent with the principles and novel features herein disclosed.

Embodiments of systems and method disclosed herein provide a processing device with a built-in temperature detection module to help prevent tampering with security features on the device. The temperature detection module is capable of being calibrated for high and low temperature accuracy while remaining at room temperature. The calibration procedure removes inaccuracies due to offsets and process variation that can arise when the device is manufactured, and eliminates the need to insert the device in a test chamber to calibrate the device at two different temperatures. Room temperature calibration is achieved by generating a number of room temperature reference voltages derived from a stable reference such as a bandgap voltage. Some of the room temperature reference voltages correspond to temperatures slightly higher than room temperature while some of the other room temperature reference voltages correspond to temperatures slightly lower than room temperature. The room temperature reference voltages are then used to find a trip point of a first comparator used to detect high temperature and a trip point of a second comparator used to detect low temperature. High and low temperature voltages for calibrating the comparators can then be determined using the corresponding trip point room temperature voltage(s) and the characteristic slope of a reference voltage that is proportional or inversely proportional to temperature.

Figure 1:
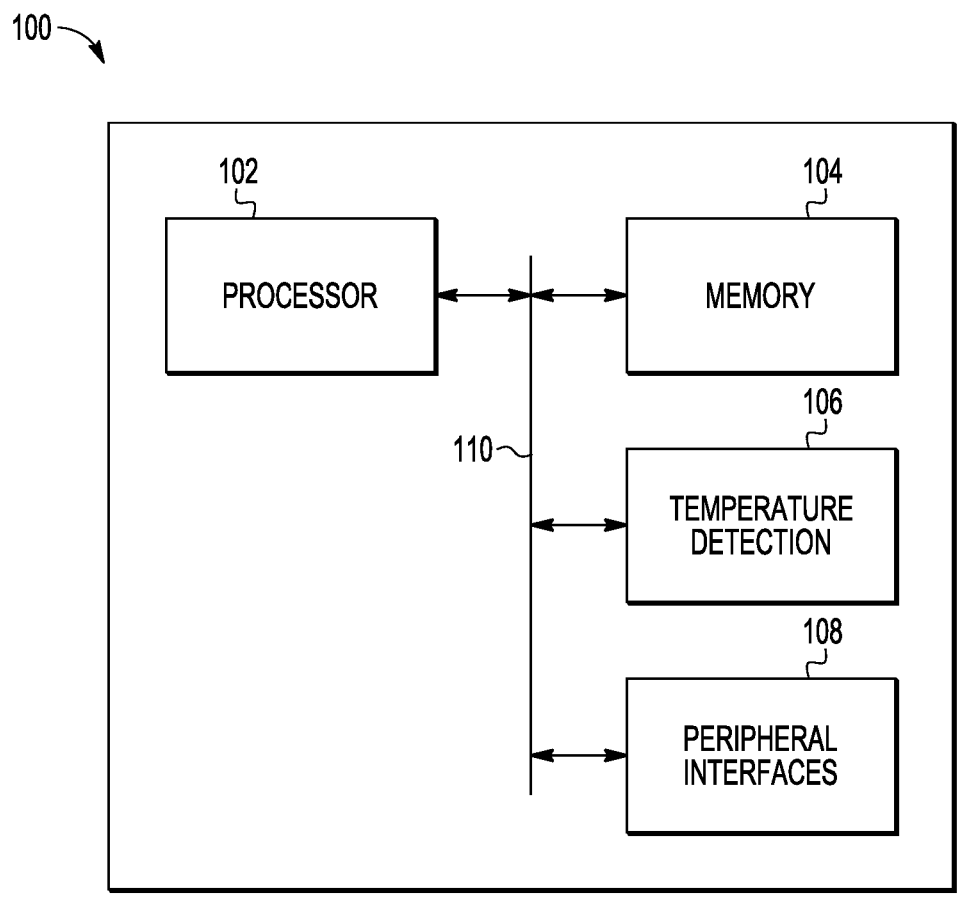
FIG. 1 is a block diagram of a microprocessor device including a temperature detection module according to one embodiment.

FIG. 1 is a block diagram of a processing device or system 100 including a processor module 102, a memory module 104, a temperature detection module 106, and peripheral interfaces 108 coupled to communicate bi-directionally with one another using system bus 110. Examples of processing device 100 may include, for instance, a System-On-Chip (SoC), an Application Specific Integrated Circuit (ASIC), a Digital Signal Processor (DSP), a Field-Programmable Gate Array (FPGA), a processor, a microprocessor, a controller, a microcontroller (MCU), a Graphics Processing Unit (GPU), or the like. Memory module 104 can be implemented, for example, as a Random Access Memory (RAM), a Static RAM (SRAM), a Magnetoresistive RAM (MRAM), a Nonvolatile RAM (NVRAM, such as "FLASH" memory, etc.), and/or a Dynamic RAM (DRAM) such as Synchronous DRAM (SDRAM), a Double Data Rate RAM, an Erasable Programmable ROM (EPROM), an Electrically Erasable Programmable ROM (EEPROM), etc. Additionally or alternatively, device 100 may include one or more mixed-signal or analog circuits, such as, for example, Analog-to-Digital Converter (ADCs), Digital-to-Analog Converter (DACs), Phased Locked Loop (PLLs), oscillators, filters, amplifiers, etc. Additionally or alternatively, device 100 may include one or more Micro-ElectroMechanical Systems (MEMS), Nano-ElectroMechanical Systems (NEMS), or the like. Peripheral interfaces 108 can be included to allow device 100 to communicate with external devices via standard interfaces such as USB, PCIe, DDR, SATA, HDMI, Ethernet and MIPI, for example.

Figure 2:
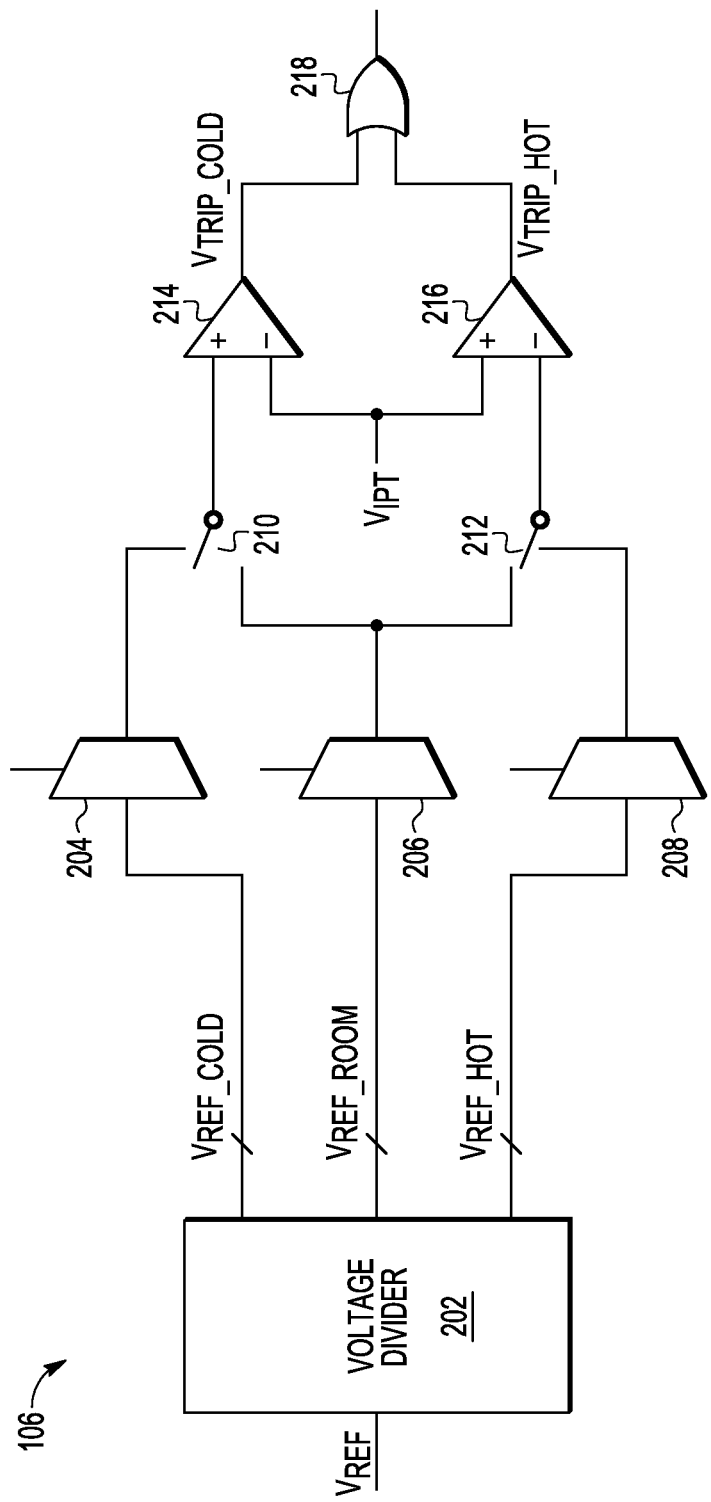
FIG. 2 is a more detailed block diagram of a temperature detection module that can be used in the device of FIG. 1, according to one embodiment.

FIG. 2 is a more detailed block diagram of a temperature detection module 106 that can be used in the device 100 of FIG. 1, according to one embodiment, that includes a voltage divider 202, multiplexers (also referred to as coupling circuits) 204, 206, 208, switches 210, 212, comparators 214, 216, and logic gate 218. Voltage divider 202 receives a reference voltage VREF at a specified voltage level, and provides a set of cold temperature reference voltages VREF_COLD(0:N), a set of room temperature reference voltages VREF_ROOM(0:N), and a set of hot temperature reference voltages VREF_HOT(0:N). The value for N can be any suitable number for calibrating over the expected range of temperatures. For example, N can be 16, 32, 64, or another suitable number.

Multiplexer 204 is coupled to receive the VREF_COLD voltages and to output a selected one of the VREF_COLD voltages to a first input of comparator 214 based on the setting of switch 210. Multiplexer 206 is coupled to receive the VREF_ROOM voltages and to output a selected one of the VREF_ROOM voltages to be coupled to a first input of comparator 214 or 216 based on the setting of switches 210, 212. Multiplexer 208 is coupled to receive the VREF_HOT voltages and to output a selected one of the VREF_HOT voltages to a first input of comparator 214 based on the setting of switch 212. A second input to comparators 214, 216 is a reference voltage that is inversely proportional to absolute temperature (VIPTAT).

During calibration, multiplexers 204, 208 can be tri-stated. Test logic in processor 102 or other controller determines trip points of comparators 214, 216 using two or more different values of VREF_ROOM. Testing both hot and cold branches of temperature detection module 106 removes errors due to variation in reference voltage VREF, comparators 214, 216, and in VIPTAT.

During test when calibrating the temperature detection module 106, first and second switches 210, 212 are set to allow the output of multiplexer 206 (i.e., a selected one of the VREF_ROOM voltages) to be provided to the non-inverting input to comparator 214 and to the inverting input of comparator 216. A selection device (not shown can be used to select the output of comparator 214 or 216, depending on whether the cold or hot branch of temperature detection module 106 is being calibrated.

When calibrating the cold branch of temperature detection module 106, in a first iteration, a nominal or middle value of the VREF_ROOM voltages can be selected. The nominal voltage for VREF_ROOM for input to comparator 214 can be an estimate of the reference voltage at the cold or low threshold temperature. The nominal voltage for input to comparator 216 can be an estimate of the reference voltage at the hot or high threshold temperature.

If the selected VREF_ROOM voltage is less than the VIPTAT voltage, the output of comparator 214 will be LOW and the test logic selects one or more subsequent VREF_ROOM voltages that is greater than the previous value until the output of comparator 214 changes or trips from LOW to HIGH. Conversely, if the initial selected VREF_ROOM voltage is greater than the VIPTAT voltage, the output of comparator will be HIGH and the test logic selects one or more subsequent VREF_ROOM voltages that are less than the previous value until the output of comparator 214 changes or trips from HIGH to LOW. The VREF_ROOM voltage that causes comparator 214 to trip is used to select one of the VREF_COLD voltages to use during normal operation of temperature detection module 106 to determine when device 100 is being operated below a specified cold temperature limit or threshold.

During test when calibrating the hot branch of temperature detection module 106, in a first iteration, a nominal or middle value of the VREF_ROOM voltages can be selected. If the selected VREF_ROOM voltage is less than or equal to the VIPTAT voltage, the output of comparator 216 will be HIGH and the test logic selects one or more subsequent VREF_ROOM voltages that is greater than the previous value until the output of comparator 216 changes or trips from HIGH to LOW. Conversely, if the initial selected VREF_ROOM voltage is greater than the VIPTAT voltage, the output of comparator will be LOW and the test logic selects one or more subsequent VREF_ROOM voltages that are less than the previous value until the output of comparator 216 changes or trips from LOW to HIGH. The VREF_ROOM voltage that causes comparator 216 to trip is used to select one of the VREF_HOT voltages to use during normal operation of temperature detection module 106 to determine when device 100 is being operated above a specified hot temperature limit or threshold.

Once the cold and hot branches are calibrated, information identifying the VREF_COLD and VREF_HOT to be used for temperature detection module 106 can be stored in a portion of non-volatile memory 104 (FIG. 1) or other suitable location, such as a fuse.

Figure 3:
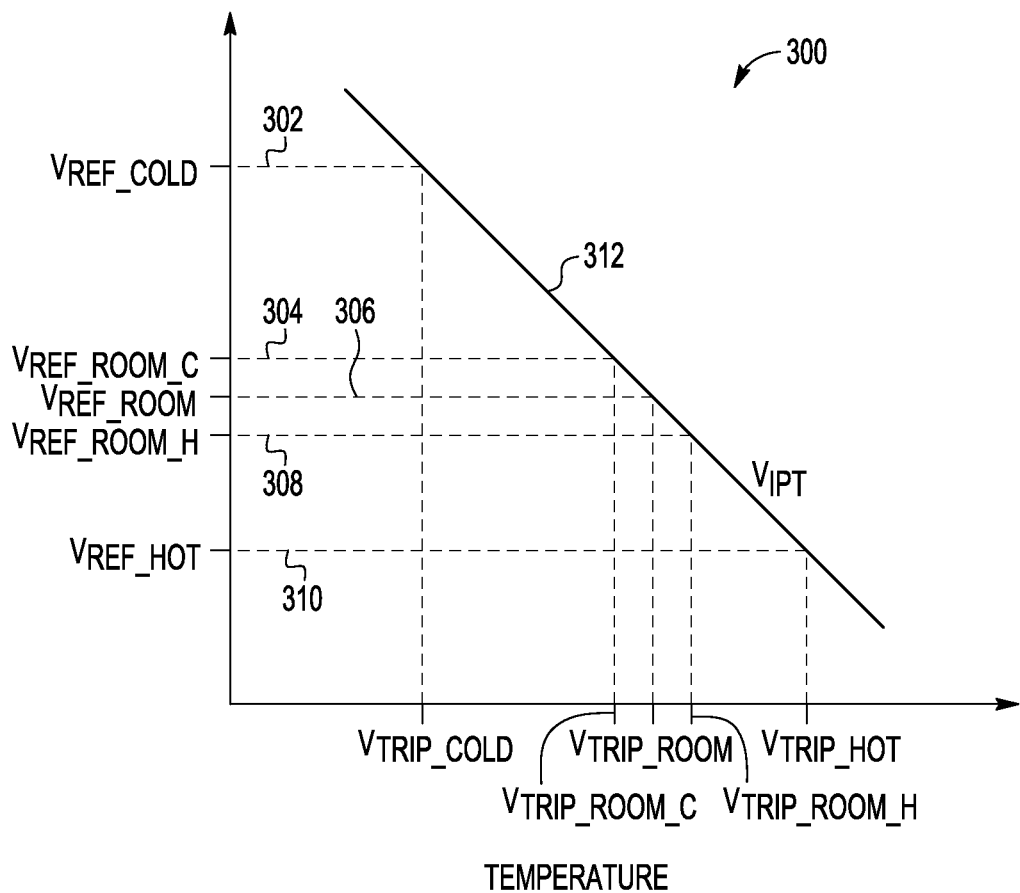
FIG. 3 is a graph of cold, hot, and room temperature calibration curves that can be used to calibrate the temperature detection module of FIG. 2.

During normal operation, switches 210 and 212 are set to couple the output of multiplexers 204, 208 to respective comparators 214, 216. If the output of either comparator 214, 216 indicate device 100 is being operated above or below the specified temperature range, the output of logic gate 218 can provide a signal to processor 102 or other suitable component. Appropriate action can then be taken to thwart any attempt to breach security of device 100. For example, a portion of the memory 104 can be erased if the logic gate 218 indicates that a temperature limit has been exceeded Referring to FIGS. 2 and 3, FIG. 3 is a graph of cold, hot, and room temperature calibration curves that can be used to calibrate the temperature detection module 106 of FIG. 2. Curve 302 corresponds to a selected VREF_COLD voltage versus trip temperature (T-TRIP_COLD) that is determined by the point at which VREF_COLD and T-TRIP-COLD intersect a VIPTAT curve 312.

Curve 304 corresponds to a selected VREF_ROOM_C voltage versus trip temperature (T-TRIP_ROOM_C) that is determined by the point at which VREF_ROOM_C and T-TRIP-ROOM_C intersect VIPTAT curve 312.

Curve 306 corresponds to a selected VREF_ROOM voltage versus trip temperature (T-TRIP_ROOM) that is determined by the point at which VREF_ROOM and T-TRIP-ROOM intersect VIPTAT curve 312.

Curve 308 corresponds to a selected VREF_ROOM_H voltage versus trip temperature (T-TRIP_ROOM_H) that is determined by the point at which VREF_ROOM_H and T-TRIP-ROOM_H intersect VIPTAT curve 312.

Curve 310 corresponds to a selected VREF_HOT voltage versus trip temperature (T-TRIP_HOT) that is determined by the point at which VREF_HOT and T-TRIP-HOT intersect VIPTAT curve 312.

As shown, VIPTAT curve 312 is a straight line having a negative slope, with higher voltage values for lower temperatures. Thus the value of VREF_COLD is higher than the value of VREF_ROOM, and the value of VREF_ROOM is higher than the value of VREF_HOT. Correspondingly, the value of T-TRIP_COLD is less than the value of T-TRIP_ROOM, and the value of T-TRIP_ROOM is less than the value of T-TRIP_HOT.

During test mode, a nominal value for VREF_ROOM is used initially, and then subsequent values of VREF_ROOM are used to determine trip points for comparators 214, 216. The voltage that trips comparator 214 is shown as VREF_ROOM_C. The voltage that trips comparator 216 is shown as VREF_ROOM_H. A first index or code corresponding to the position of VREF_ROOM_C relative to VREF_ROOM can be used to determine which of the VREF_COLD values to use to calibrate comparator 214 for normal operation. Similarly, an second index or code corresponding to the position of VREF_ROOM_H relative to VREF_ROOM can be used to determine which of the VREF_HOT values to use to calibrate comparator 216 for normal operation.

Note that, depending on the adjustments that are required to calibrate temperature detection module 106, adjustment voltages can be higher or lower than the nominal value of VREF_ROOM. For example, instead of the values of VREF_ROOM_C and VREF_ROOM_H shown in FIG. 3, the value of VREF_ROOM_C may be lower than the value of VREF_ROOM and/or the value of VREF_ROOM_H. Similarly, the value of VREF_REF_ROOM_H may be higher than the value of VREF_ROOM and/or VREF_ROOM_C.

Figure 4:
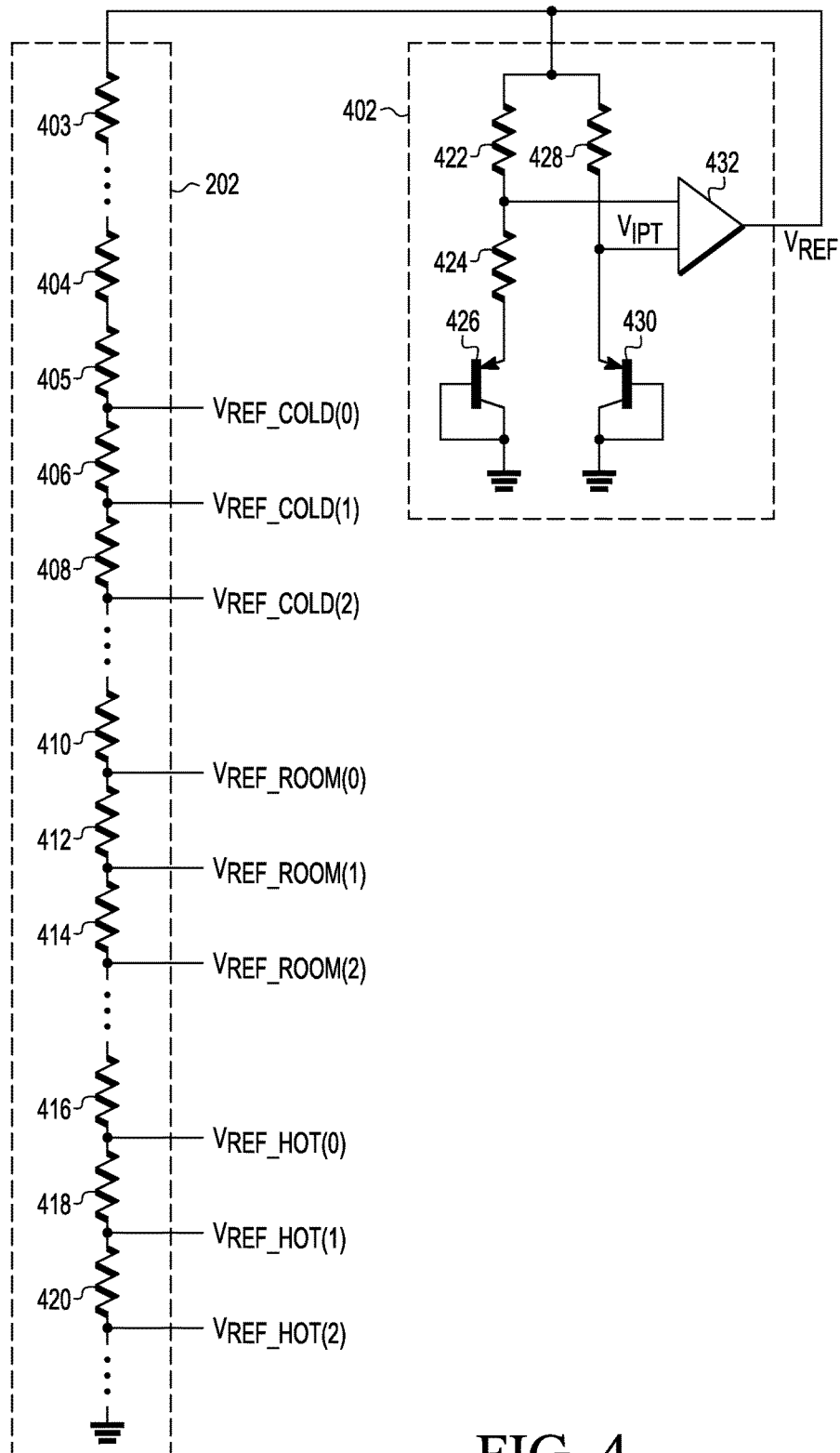
FIG. 4 is a schematic diagram of a voltage divider and band gap reference circuit that can be used to supply reference voltages for the temperature detection module of FIG. 2.

FIG. 4 is a schematic diagram of a voltage divider 202 and band gap reference circuit 402 that can be used to supply reference voltages (e.g. VREF, VREF_ROOM, VREF_COLD, VREF_HOT and VIPTAT) for the temperature detection module 106 of FIG. 2. Voltage divider 202 includes a plurality of resistors 403-420 coupled in series. A first terminal of resistor 403 is coupled to the output of bandgap circuit 402. A terminal of resistor 420 at the end of the series of resistors 403-420 is coupled to ground. A set of voltages VREF_COLD(0:2) are tapped between respective resistors 405, 406 and 408. Further along voltage divider 202, a set of voltages VREF_ROOM(0:2) are tapped between respective resistors 410, 412, and 414. Still further along voltage divider 202, a set of voltages VREF_HOT(0:2) are tapped between respective resistors 416, 418, 420. Note that voltage divider 202 can include any suitable number of resistors or other resistive components to provide a desired or required number of voltages in each range. Further, taps for the voltages do not have to be taken from sequential resistors, but two or more resistors may be included between taps for the voltages.

Bandgap circuit 402 includes two parallel branches and amplifier 432. A first branch includes resistors 422, 424 and bipolar junction transistor 426 coupled in series between the output of bandgap circuit 402 and ground. A second branch includes resistor 428 and bipolar junction transistor 430 coupled in series between the output of bandgap circuit 402 and ground. The base-emitter voltage of transistor 430 is used to supply VIPTAT voltage and is also supplied at a first input to amplifier 432. A second input to amplifier is coupled between resistors 422 and 424. The output of amplifier 432 is the reference voltage VREF.

Note that voltages used in temperature detection module 106 can be generated using circuitry or devices other than a series of resistors 403-420 and bandgap circuit 402.

By now it should be appreciated that, in some embodiments, there has been provided a semiconductor device (106) that can comprise a first comparator (214) having a first input that receives a temperature dependent voltage, an output to indicate if the circuit has a temperature that is below a low threshold temperature, and a second input having associated therewith a first nominal voltage. A second comparator (216) can have a first input that receives the temperature dependent voltage, an output to indicate if the circuit has a temperature that exceeds a high threshold temperature, and a second input having associated therewith a second nominal voltage. A source (202) of a plurality of voltages can be coupled to the voltage supply circuit having a plurality of outputs for providing a plurality of voltages based on a reference voltage (Vref). A test module (206, 210, 212) can run a test at room temperature with the first and second comparators using the source of the plurality of voltages to determine an adjustment to the first nominal voltage that is to be applied to the second input of the first comparator during normal operation of the circuit and a second output of the source of the plurality of voltages to determine an adjustment to the second nominal voltage that is to be applied to the second input of the second comparator during normal operation of the circuit.

In another aspect, a first coupling circuit (204) can couple an output of the source of the plurality of voltages that corresponds to a resulting voltage from the adjustment to the first nominal voltage.

In another aspect, the semiconductor device can further comprise a second coupling circuit (216) that couples an output of the source of the plurality of voltages that corresponds to a resulting voltage from the adjustment to the second nominal voltage.

In another aspect, the first coupling circuit comprises a first multiplexer coupled to the source of the plurality of voltages.

In another aspect, the temperature dependent voltage comprises a Vbe voltage.

In another aspect, the source of the plurality of voltages comprises a voltage divider having an upper voltage portion (405, 406, 408) from which is selected an output of the source of the plurality of voltages that corresponds to a resulting voltage from the adjustment to the first nominal voltage, a lower voltage portion (416, 418, 420) from which is selected an output of the source of the plurality of voltages that corresponds to a resulting voltage from the adjustment to the second nominal voltage; and a middle portion (410, 412, 414) for use in determining the adjustments to the first and second nominal voltages.

In another aspect, the test module can comprise a test multiplexer (206) coupled to the middle portion of the source of the plurality of voltages and operated under control of a processor that has access to a memory.

In another aspect, the nominal voltage for the second input of the first comparator is an estimate of the reference voltage at the low threshold temperature.

In another aspect, the nominal voltage for the second input of the second comparator is an estimate of the reference voltage at the high threshold temperature.

In another embodiment, a method of determining if a temperature of a system has exceeded a hot threshold or a cold threshold can comprise determining, at room temperature (202, 206, 210, 214) a first adjustment to first nominal settings. The first nominal settings are for a first input to a first comparator (214). A second adjustment to second nominal settings is determined at room temperature (202, 206, 210, 216). The second nominal settings are for a first input to a second comparator (216). During normal operation of the system, the temperature using a temperature dependent voltage (VIPT) is monitored with the first comparator adjusted with the first adjustment and second comparator adjusted with the second adjustment.

In another aspect, the determining the first adjustment can comprise coupling a test multiplexer (206) to the first comparator and to a source (202) of a plurality of voltages based on a reference voltage.

In another aspect, the determining the second adjustment can comprise coupling the test multiplexer to the second comparator and to the source of the plurality of voltages based on the reference voltage.

In another aspect, the monitoring the temperature can comprise coupling the first comparator to an output (202) that reflects the first adjustment of the source of the plurality of voltages.

In another aspect, the monitoring the temperature can comprise coupling the second comparator to an output (202) that reflects the second adjustment of the source of the plurality of voltages.

In another aspect, the monitoring the temperature can be further characterized by coupling outputs of the first and second comparators to a logic gate (218) that signals when the system has exceeded the hot threshold or the cold threshold.

In another aspect, the monitoring the temperature can comprise coupling a temperature dependent voltage (VIPT) to the first comparator and the second comparator.

In another aspect, the determining the first adjustment can comprise coupling the temperature dependent voltage to a second input of the first comparator.

In yet another embodiment, a system can comprise a processor (102), a memory (104) coupled to the processor, and a temperature detection module (106) coupled to the processor. The temperature detection module can comprise a voltage divider (202) having a plurality of outputs, a first comparator (214) having a first input coupled to a temperature dependent voltage (VIPT), an output indicating if the system is at a temperature below a low temperature threshold, and a second input having associated therewith a first nominal voltage. A second comparator (214) can have a first input coupled to the temperature dependent voltage, an output indicating if the system is at a temperature exceeding a high temperature threshold, and a second input having associated therewith a second nominal voltage. A calibration circuit (206, 210, 212) can be coupled to the voltage divider that selectively, under control of the processor, controllably couples an output of the voltage divider to the second input of the first comparator and the second input of the second comparator until the processor determines a first adjustment to the first nominal voltage and a second adjustment to the second nominal voltage. A first multiplexer (204) can be coupled to the voltage divider that, under the control of the processor, couples an output of the voltage of divider that is equal to the first nominal voltage adjusted according to the first adjustment. A second multiplexer (216) coupled to the voltage divider that, under the control of the processor, couples an output of the voltage of divider that is equal to the second nominal voltage adjusted according to the second adjustment.

In another aspect, the temperature detection module further comprises a logic gate (218) having a first input coupled to the output of the first comparator, a second input coupled to the output of the second comparator, and an output indicating if a temperature violation has occurred.

In another aspect, the controller can erase a portion of the memory if the logic gate indicates that a temperature violation has occurred.

Because the apparatus implementing the present disclosure is, for the most part, composed of electronic components and circuits known to those skilled in the art, circuit details will not be explained in any greater extent than that considered necessary as illustrated above, for the understanding and appreciation of the underlying concepts of the present disclosure and in order not to obfuscate or distract from the teachings of the present disclosure.

Although the disclosure has been described with respect to specific conductivity types or polarity of potentials, skilled artisans appreciated that conductivity types and polarities of potentials may be reversed.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the disclosure described herein are, for example, capable of operation in other orientations than those illustrated or otherwise described herein.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the disclosure. Of course, the description of the architecture has been simplified for purposes of discussion, and it is just one of many different types of appropriate architectures that may be used in accordance with the disclosure. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure is described herein with reference to specific embodiments, various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to disclosures containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A semiconductor device comprising:
a first comparator having a first input that receives a temperature dependent voltage, an output to indicate if the device has a temperature that is below a low threshold temperature, and a second input having associated therewith a first nominal voltage;

a second comparator having a first input that receives the temperature dependent voltage, an output to indicate if the device has a temperature that exceeds a high threshold temperature, and a second input having associated therewith a second nominal voltage;

a source of a plurality of voltages coupled to the voltage supply device having a plurality of outputs for providing a plurality of voltages based on a reference voltage; and a test module that runs a test at room temperature with the first and second comparators using a first set of room temperature voltages from the source of the plurality of voltages to determine a first adjustment to the first nominal voltage that is to be applied to the second input of the first comparator during normal operation of the device at temperatures outside a range of room temperatures associated with the first set of room temperature voltages, and a second set of room temperature voltages from the source of the plurality of voltages to determine a second adjustment to the second nominal voltage that is to be applied to the second input of the second comparator during normal operation of the device at temperatures outside a range of room temperatures associated with the second set of room temperature voltages, wherein the first adjustment is determined using one of the first set of room temperature reference voltages that causes output of the first comparator to change from a high voltage to a low voltage or from a low voltage to a high voltage during the test, and wherein the second adjustment is determined using one of the second set of room temperature reference voltages that causes output of the second comparator to change from a high voltage to a low voltage or from a low voltage to a high voltage during the test.

2. The device of claim 1, further comprising a first coupling circuit that couples an output of the source of the plurality of voltages that corresponds to a resulting voltage from the adjustment to the first nominal voltage.

3. The device of claim 2, further comprising a second coupling circuit that couples an output of the source of the plurality of voltages that corresponds to a resulting voltage from the adjustment to the second nominal voltage.

4. The device of claim 3, wherein the first coupling circuit comprises a first multiplexer coupled to the source of the plurality of voltages.

5. The device of claim 1, wherein the temperature dependent voltage comprises a Vbe voltage.

6. The device of claim 1, wherein the source of the plurality of voltages comprises a voltage divider having an upper voltage portion from which is selected an output of the source of the plurality of voltages that corresponds to a resulting voltage from the adjustment to the first nominal voltage, a lower voltage portion from which is selected an output of the source of the plurality of voltages that corresponds to a resulting voltage from the adjustment to the second nominal voltage; and a middle portion for use in determining the adjustments to the first and second nominal voltages.

7. The device of claim 6, wherein the test module comprises a test multiplexer coupled to the middle portion of the source of the plurality of voltages and operated under control of a processor that has access to a memory.

8. The device of claim 1, wherein the nominal voltage for the second input of the first comparator is an estimate of the reference voltage at the low threshold temperature.

9. The device of claim 8, wherein the nominal voltage for the second input of the second comparator is an estimate of the reference voltage at the high threshold temperature.

10. The device of claim 1, wherein the first adjustment is determined using the one of the first set of room temperature reference voltages that causes output of the first comparator to change from the high voltage to the low voltage.

11. The device of claim 1, wherein the first adjustment is determined using the one of the first set of room temperature reference voltages that causes output of the first comparator to change from the low voltage to the low high.

12. The device of claim 1, wherein the second adjustment is determined using the one of the second set of room temperature reference voltages that causes output of the second comparator to change from the high voltage to the low voltage.

13. The device of claim 1, wherein the second adjustment is determined using the one of the second set of room temperature reference voltages that causes output of the second comparator to change from the low voltage to the low high.

* * * * *